(12) United States Patent
Zokoe, Jr. et al.

(10) Patent No.: US 12,460,568 B2
(45) Date of Patent: Nov. 4, 2025

(54) ENGINE HEALTH AND OIL CONSUMPTION RATE DIAGNOSTIC USING BACK PRESSURE

(71) Applicant: Cummins Emission Solutions Inc., Columbus, IN (US)

(72) Inventors: James Zokoe, Jr., Columbus, IN (US); Shirish S. Punde, Columbus, IN (US); Bryon D. Staebler, Columbus, IN (US); Rayomand Dabhoiwala, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/577,143

(22) PCT Filed: Jul. 8, 2021

(86) PCT No.: PCT/US2021/040918
§ 371 (c)(1),
(2) Date: Jan. 5, 2024

(87) PCT Pub. No.: WO2023/282902
PCT Pub. Date: Jan. 12, 2023

(65) Prior Publication Data
US 2025/0043710 A1 Feb. 6, 2025

(51) Int. Cl.
*F01N 9/00* (2006.01)
*F01N 11/00* (2006.01)

(52) U.S. Cl.
CPC ............ *F01N 9/007* (2013.01); *F01N 11/002* (2013.01); *F01N 2900/1606* (2013.01); *F01N 2900/1611* (2013.01)

(58) Field of Classification Search
CPC ................... F01N 9/007; F01N 11/002; F01N 2900/1606; F01N 2900/1611
See application file for complete search history.

(56) References Cited

U.S. PATENT DOCUMENTS

| | | | |
|---|---|---|---|
| 6,601,442 B1 | 8/2003 | Decker et al. | |
| 8,660,741 B2 | 2/2014 | Nevin et al. | |
| 10,066,575 B2 * | 9/2018 | Suchta | F01N 9/00 |
| 11,268,425 B2 * | 3/2022 | Schulz | F02D 41/029 |
| 11,346,294 B2 * | 5/2022 | Schwaab | F01N 3/023 |
| 11,566,554 B2 * | 1/2023 | Ratts | F01N 13/0093 |
| 2006/0005534 A1 * | 1/2006 | Wirth | F01N 11/00 60/297 |

(Continued)

OTHER PUBLICATIONS

International Search Report and Written Opinion for PCT/US2021/040918 issued Oct. 19, 2021.

*Primary Examiner* — Matthew T Largi
(74) *Attorney, Agent, or Firm* — Foley & Lardner LLP

(57) ABSTRACT

An aftertreatment system includes a particulate filter configured to receive exhaust gas from an engine and a controller that measures an actual pressure drop across the particulate filter, determines an expected total ash accumulation rate in the particulate filter based on a current duty cycle of the engine, determines an expected pressure drop across the particulate filter based on the expected total ash accumulation rate, compares the expected pressure drop with the actual pressure drop, and determines whether an oil consumption rate in the engine is abnormal based on the comparison.

12 Claims, 8 Drawing Sheets

(56) References Cited

U.S. PATENT DOCUMENTS

| | | | |
|---|---|---|---|
| 2008/0295484 A1* | 12/2008 | Scaife | F01N 9/005 |
| | | | 60/274 |
| 2012/0083990 A1* | 4/2012 | Nevin | F02D 41/029 |
| | | | 703/2 |
| 2014/0060008 A1* | 3/2014 | Dittler | F01N 3/0232 |
| | | | 60/274 |
| 2016/0160723 A1* | 6/2016 | Thomas | F01N 3/0232 |
| | | | 60/274 |
| 2016/0326934 A1 | 11/2016 | Kim | |
| 2017/0159535 A1 | 6/2017 | Hall et al. | |
| 2019/0390588 A1* | 12/2019 | Inoue | F01N 9/002 |
| 2022/0186643 A1* | 6/2022 | Tsukagoshi | F01N 3/023 |

* cited by examiner

| 1400 | 1500 | 1600 | 1700 | 1800 | 1900 | 2000 | 2100 | 2200 |
| 9 | 10 | 11 | 12 | 13 | 14 | 15 | 16 | 17 |
|---|---|---|---|---|---|---|---|---|
| 24.1900 | 28.9056 | 34.1356 | 38.6929 | 42.8091 | 47.4000 | 52.8335 | 58.7494 | 64.9669 |
| 20.2060 | 24.5346 | 29.3056 | 33.4974 | 37.2760 | 41.7013 | 46.3792 | 51.2426 | 56.4095 |
| 17.0515 | 20.8447 | 25.1023 | 28.7109 | 32.7068 | 36.4405 | 40.2029 | 44.2767 | 48.5463 |
| 14.3485 | 17.7061 | 21.1378 | 24.4246 | 27.9239 | 31.1952 | 24.3672 | 37.7527 | 41.3263 |
| 12.0518 | 14.7474 | 17.5731 | 20.2532 | 23.0179 | 25.8773 | 28.7682 | 31.6941 | 34.7465 |
| 9.8506 | 11.9047 | 14.2685 | 16.4992 | 18.5932 | 20.9126 | 23.4702 | 26.0579 | 28.7210 |
| 8.0404 | 9.5991 | 11.4027 | 13.1790 | 14.7992 | 16.6718 | 18.7103 | 20.9322 | 23.2385 |
| 6.4618 | 7.6406 | 8.9312 | 10.2584 | 11.5573 | 12.9672 | 14.5581 | 16.3930 | 18.3283 |
| 5.0792 | 5.8770 | 6.8061 | 7.8193 | 8.7294 | 9.7527 | 11.0391 | 12.4923 | 14.0366 |
| 3.9943 | 4.5951 | 5.1988 | 5.8019 | 6.3956 | 7.2007 | 8.1545 | 9.2167 | 10.3731 |
| 3.2200 | 3.5491 | 3.9117 | 4.2474 | 4.6135 | 5.1835 | 5.8139 | 6.5328 | 7.3426 |
| 2.6854 | 2.8470 | 3.0038 | 3.1700 | 3.3433 | 3.6665 | 4.0245 | 4.4548 | 4.8978 |
| 2.4346 | 2.4913 | 2.5735 | 2.5977 | 2.5464 | 2.6496 | 2.8313 | 2.9868 | 3.1751 |
| 2.4943 | 2.4498 | 2.3940 | 2.2808 | 2.1515 | 2.1629 | 2.1849 | 2.2336 | 2.2909 |
| 2.7871 | 2.7067 | 2.2279 | 2.0523 | 2.1517 | 2.1152 | 2.0627 | 2.0797 | 2.0662 |
| 3.1715 | 2.8382 | 2.1924 | 2.0047 | 2.1641 | 2.1702 | 2.1278 | 2.1057 | 2.1451 |
| 2.3820 | 1.7839 | 1.4764 | 1.4639 | 1.7369 | 2.2077 | 2.5711 | 2.9941 | 3.3932 |

FIG. 5A Cont.

| 1400 | 1500 | 1600 | 1700 | 1800 | 1900 | 2000 | 2100 | 2200 |
| 9 | 10 | 11 | 12 | 13 | 14 | 15 | 16 | 17 |
| --- | --- | --- | --- | --- | --- | --- | --- | --- |
| 0.002596 | 0.003045 | 0.003543 | 0.003977 | 0.004368 | 0.004805 | 0.005323 | 0.005886 | 0.006478 |
| 0.002217 | 0.002629 | 0.003083 | 0.003482 | 0.003842 | 0.004263 | 0.004708 | 0.005171 | 0.005663 |
| 0.001916 | 0.002277 | 0.002683 | 0.003026 | 0.003407 | 0.003762 | 0.004120 | 0.004508 | 0.004915 |
| 0.001659 | 0.001979 | 0.002305 | 0.002618 | 0.002951 | 0.003263 | 0.003565 | 0.003887 | 0.004227 |
| 0.001440 | 0.001697 | 0.001956 | 0.002221 | 0.002484 | 0.002756 | 0.003032 | 0.003310 | 0.003601 |
| 0.001231 | 0.001426 | 0.001651 | 0.001864 | 0.002063 | 0.002284 | 0.002527 | 0.002774 | 0.003027 |
| 0.001058 | 0.001207 | 0.001379 | 0.001548 | 0.001702 | 0.001880 | 0.002074 | 0.002286 | 0.002505 |
| 0.000908 | 0.001020 | 0.001143 | 0.001270 | 0.001393 | 0.001527 | 0.001679 | 0.001854 | 0.002038 |
| 0.000777 | 0.000852 | 0.000941 | 0.001037 | 0.001124 | 0.001221 | 0.001344 | 0.001482 | 0.001629 |
| 0.000673 | 0.000730 | 0.000788 | 0.000845 | 0.000902 | 0.000978 | 0.001069 | 0.001170 | 0.001280 |
| 0.000600 | 0.000631 | 0.000665 | 0.000697 | 0.000732 | 0.000786 | 0.000846 | 0.000915 | 0.000992 |
| 0.000549 | 0.000564 | 0.000579 | 0.000595 | 0.000611 | 0.000642 | 0.000676 | 0.000717 | 0.000759 |
| 0.000525 | 0.000530 | 0.000538 | 0.000540 | 0.000535 | 0.000545 | 0.000563 | 0.000577 | 0.000595 |
| 0.000530 | 0.000526 | 0.000521 | 0.000510 | 0.000498 | 0.000499 | 0.000501 | 0.000506 | 0.000511 |
| 0.000558 | 0.000551 | 0.000505 | 0.000488 | 0.000498 | 0.000494 | 0.000489 | 0.000491 | 0.000490 |
| 0.000595 | 0.000563 | 0.000502 | 0.000484 | 0.000499 | 0.000500 | 0.000496 | 0.000493 | 0.000497 |
| 0.000520 | 0.000463 | 0.000434 | 0.000432 | 0.000458 | 0.000503 | 0.000538 | 0.000578 | 0.000616 |

FIG. 5B Cont.

ENGINE HEALTH AND OIL CONSUMPTION RATE DIAGNOSTIC USING BACK PRESSURE

CROSS-REFERENCE TO RELATED APPLICATION

This application is a National Stage of PCT Application No. PCT/US2021/040918, filed Jul. 8, 2021, the contents of which are hereby incorporated by reference in their entirety.

TECHNICAL FIELD

The present disclosure relates generally to aftertreatment systems for use with internal combustion engines.

BACKGROUND

An exhaust aftertreatment system is used to treat exhaust gas generated by an internal combustion engine. The exhaust aftertreatment system may include a selective catalytic reduction system that is formulated to reduce oxides of nitrogen in the exhaust gas in the presence of a catalyst and reductant. The exhaust aftertreatment system may also include one or more filters to remove debris and other particulates from the exhaust gas. By treating the exhaust gas using the exhaust aftertreatment system, the exhaust aftertreatment system reduces the levels of harmful emissions in the exhaust gas that would otherwise be emitted into the atmosphere.

SUMMARY

The present disclosure is directed to a mechanism for determining an abnormal oil consumption rate in an engine associated with an aftertreatment system. Abnormal oil consumption rate may be indicative of wear on engine components. Thus, by identifying abnormal oil consumption rates, wear on engine components may be timely identified. In some embodiments, increased oil consumption rates in the engine may correspond to excessive ash and/or soot accumulation in a particulate filter of the aftertreatment system. As ash and/or soot accumulates on the particulate filter, the pressure drop across the particulate filter increases. Thus, pressure drop signals across the particulate filter may be used to identify abnormal oil consumption rates in the engine.

In accordance with one embodiment of the present disclosure, an aftertreatment system is disclosed. The aftertreatment system includes a particulate filter configured to receive exhaust gas from an engine and a controller that executes computer-readable instructions stored on a memory to determine an actual pressure drop across the particulate filter based on pressure measurements across the particulate filter, determine an expected total ash accumulation rate in the particulate filter based on a current duty cycle of the engine, determine an expected pressure drop across the particulate filter based on the expected total ash accumulation rate, compare the expected pressure drop with the actual pressure drop, and determine whether an oil consumption rate in the engine is abnormal based on the comparison.

In accordance with another embodiment of the present disclosure, a method is disclosed. The method includes determining, by a controller of an aftertreatment system, an actual pressure drop across a particulate filter configured to receive exhaust gas from an engine based on pressure measurements across the particulate filter, determining, by the controller, an expected total ash accumulation rate in the particulate filter based on a current duty cycle of the engine, determining, by the controller, an expected pressure drop across the particulate filter based on the expected total ash accumulation rate, comparing, by the controller, the expected pressure drop with the actual pressure drop, and determining, by the controller, whether an oil consumption rate in the engine is abnormal based on the comparison.

In accordance with another embodiment of the present disclosure, a non-transitory computer-readable media having computer-readable instructions stored thereon is disclosed. The computer-readable instructions when executed by a controller of an aftertreatment system causes the controller to perform a process including determining an actual pressure drop across a particulate filter configured to receive exhaust gas from an engine based on pressure measurements across the particulate filter, determining an expected total ash accumulation rate in the particulate filter based on a current duty cycle of the engine, determining an expected pressure drop across the particulate filter based on the expected total ash accumulation rate, comparing the expected pressure drop with the actual pressure drop, and determining whether an oil consumption rate in the engine is abnormal based on the comparison.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
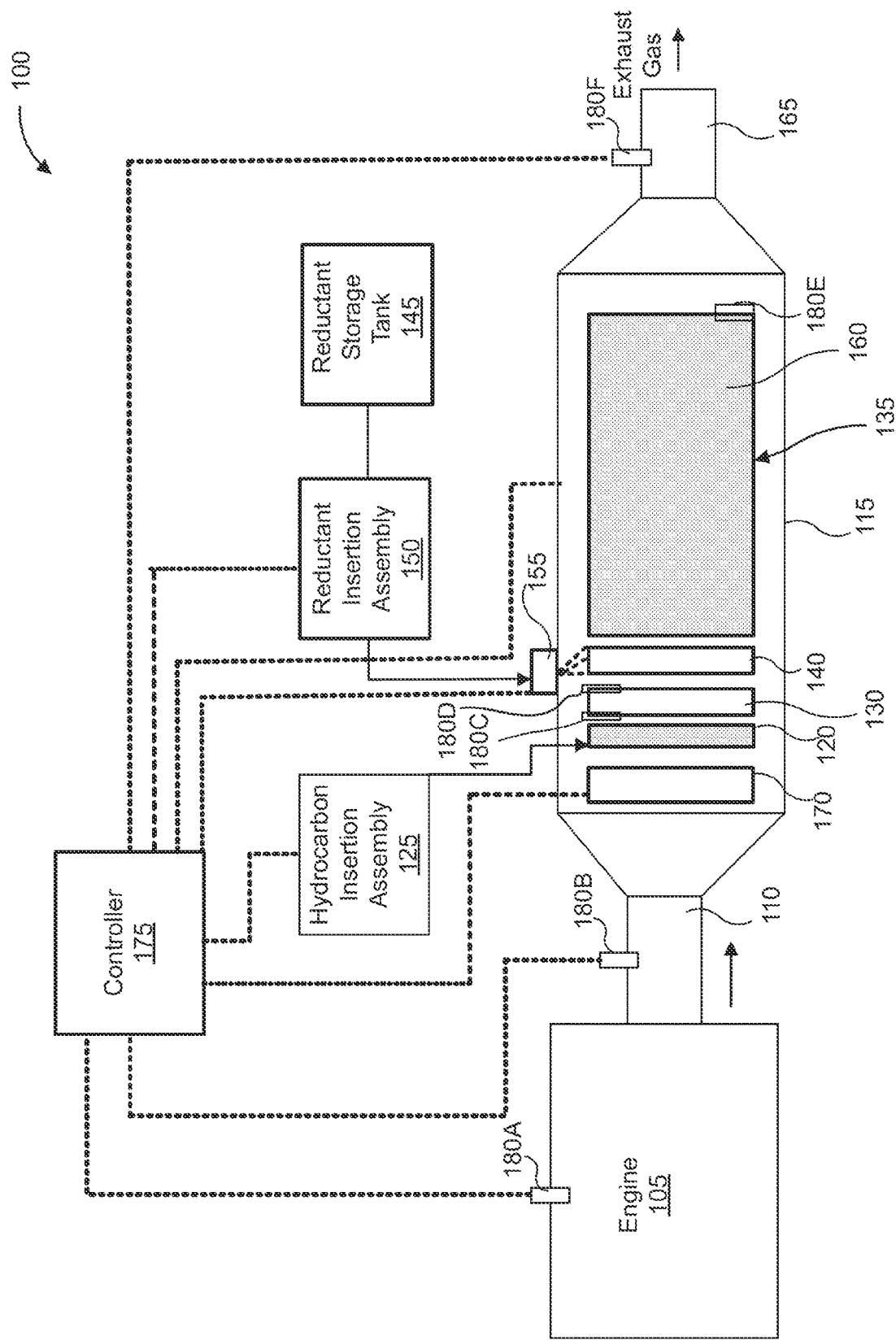
FIG. 1 is an example block diagram of an aftertreatment system, in accordance with some embodiments of the present disclosure.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

This application is directed to an aftertreatment system designed to treat exhaust gases emitted from an engine. The aftertreatment system may remove various types of undesirable constituents from the exhaust gas before releasing the treated exhaust gas into the atmosphere. Among other components, the aftertreatment system includes a particulate filter that is configured to remove soot, ash, debris, and other particulate matter from the exhaust gas entering the aftertreatment system. Oil consumption in the engine is a contributing factor to ash accumulation in the particulate filter. Ash from oil consumption accumulates over time in the particulate filter and, combined with soot, creates restriction (e.g., wear) on the engine components. As ash and/or soot accumulate in the particulate filter, the back pressure or pressure drop across the particulate filter increases. The present disclosure utilizes a pressure drop signal across the particulate filter to predict an ash and/or soot loading response (e.g., ash and/or soot accumulation rate) and determine when engine components may be wearing, or operation may be abnormal, as well as when the particulate filter may need to be regenerated or replaced.

Specifically, the present disclosure provides a mechanism in which a controller may run a diagnostics to compare a pressure drop signature over time against tuned calibration tables to determine when ash and/or soot accumulation rate is excessive. The determination may be used to flag potential engine issues that increase oil consumption before full service of the particulate filter may be needed. In particular, as oil consumption increases, the ash accumulation in the particulate filter increases as well. Thus, increased oil consumption rates may be indicative of increased ash and/or soot accumulation in the particulate filter. Therefore, the present disclosure provides a mechanism to detect increased or abnormal oil consumption rates to indicate increased ash and/or soot accumulation in the particulate filter.

In some embodiments, average (standard/healthy) engine operation may be used to create pressure drop calibration tables with soot and/or ash to estimate the total loading of soot and/or ash in the particulate filter over time. The oil consumption over average duty cycles may be measured as a standard reference in an average (standard/healthy) engine. The calibration tables may be combined with the estimation of healthy engine oil consumption rate over standard duty cycles to determine if the particulate filter is accumulating excessive ash and/or soot.

Referring now to FIG. 1, an example block diagram of an aftertreatment system 100 is shown, in accordance with some embodiments of the present disclosure. The aftertreatment system 100 is configured to receive exhaust gas from an engine 105. The engine 105 may be a compression ignited internal combustion engine such as a diesel engine, a spark-ignited internal combustion engine such as a gasoline engine, or any other types of engine such as a natural gas engine, a dual fuel engine, a biodiesel engine, an E-85 engine, etc. The engine 105 emits exhaust gas as a result of combustion of air from the atmosphere with fuel. The exhaust gas is discharged from the engine 105, via an inlet conduit 110, into a housing 115.

The housing 115 defines an internal volume within which one or more elements for treating the exhaust gas are disposed. To withstand the operating conditions, the housing 115 may be formed from a rigid, heat-resistant, and corrosion-resistant material such as stainless steel, iron, aluminum, metals, ceramics, or any other suitable material. Although the housing 115 has been shown in FIG. 1 as having a particular shape and size, the housing may have any suitable cross-section (e.g., circular, square, rectangular, oval, elliptical, polygonal, etc.) and any suitable size. The housing 115 may house an oxidation catalyst 120 for oxidizing nitric oxide and certain types of particulate matter from the exhaust gas, and decomposing unburnt hydrocarbons from the exhaust gas. In some embodiments, the oxidation catalyst 120 may be a diesel oxidation catalyst ("DOC") or other type of oxidation catalyst that is suitable for use in the aftertreatment system 100.

In some embodiments, the aftertreatment system 100 may be associated with a hydrocarbon insertion assembly 125 for selectively injecting a hydrocarbon (e.g., fuel) into the oxidation catalyst 120. The oxidation catalyst 120 may catalyze ignition of the hydrocarbon so as to increase a temperature of the exhaust gas for regenerating the oxidation catalyst and/or regenerating other elements within the housing 115. In some embodiments, the aftertreatment system 100 may also include a particulate filter 130 within the housing 115. In some embodiments and as shown, the particulate filter 130 may be disposed downstream of the oxidation catalyst 120. In other embodiments, the particulate filter 130 may be disposed upstream of the oxidation catalyst 120. When positioned "upstream" of the oxidation catalyst 120, the particulate filter 130 may be positioned between the inlet conduit 110 and the oxidation catalyst such that the exhaust gas exiting the particulate filter enters the oxidation catalyst. When positioned "downstream" of the oxidation catalyst 120, the particulate filter 130 may be positioned between the oxidation catalyst and a selective catalytic reduction ("SCR") system 135 such that the exhaust gas exiting the oxidation catalyst enters the particulate filter. In some embodiments, particulate filters may be provided both upstream and downstream of the oxidation catalyst 120.

The particulate filter 130 may be configured to remove particulate matter (e.g., soot, ash, debris, inorganic particles, etc.) from the exhaust gas. The particulate filter may be any of a variety of filters that are suitable for use within the aftertreatment system 100. For example, in some embodiments, the particulate filter 130 may be a diesel particulate filter ("DPF") having a ceramic filter (e.g. cordierite), and may be symmetric or asymmetric. In some embodiments, the particulate filter 130 may be catalyzed. In some embodiments, the oxidation catalyst 120 and the particulate filter 130 may be integrated into a single component.

The housing 115 may also include the SCR system 135 that is configured to reduce constituents such as oxides of nitrogen (NOx) gases, carbon monoxide (CO) gases, hydrocarbons, etc. from the exhaust gas. The SCR system 135 may include or be associated with a decomposition chamber 140 that is configured to receive reductant from a reductant storage tank 145 via a reductant insertion assembly 150. A reductant port 155 may be positioned on a sidewall of the housing 115 to allow insertion of the reductant into an internal volume of the decomposition chamber 140. In some embodiments, the reductant port 155 may include a reductant injector that is configured to combine a flow of reductant received via the reductant port with compressed air, and deliver a stream or a jet of the reductant-air combination into the decomposition chamber 140. In some embodiments, the reductant injector may be a nozzle of a predetermined diameter. In other embodiments, other mechanisms may be used to selectively deliver the reductant into the decomposition chamber 140. Thus, the decomposition chamber 140 may be configured to receive exhaust gas and a reductant, and facilitate mixing of the exhaust gas with the reductant to form an exhaust gas-reductant mixture. In some embodiments, mixers, baffles, vanes, or other structures may be used in conjunction with the decomposition chamber 140 to further facilitate mixing of the reductant with the exhaust gas.

The decomposition chamber 140 may be structured to receive reductant in a variety of ways. For example, in some embodiments, the decomposition chamber 140 may be positioned upstream of the SCR system 135 to allow the reductant to be inserted, via the reductant port 155, into the decomposition chamber upstream of the SCR system. In other embodiments, the decomposition chamber 140 may be structured such that the reductant port 155 is configured to allow the reductant to be inserted directly into the SCR system 135. In yet other embodiments, the decomposition chamber 140 may be disposed in the inlet conduit 110. While the decomposition chamber 140 is shown to be downstream of the oxidation catalyst 120 in FIG. 1, the decomposition chamber may instead be located upstream of the oxidation catalyst, upstream or downstream of the particulate filter 130, and/or upstream of the SCR system 135.

The reductant that is injected into the decomposition chamber via the reductant port 155 may be stored within the reductant storage tank 145. The reductant facilitates decomposition of the constituents of the exhaust gas (e.g., NOx gases included in the exhaust gas). Any suitable reductant may be used depending upon the constituents of the exhaust gas. For example, in some embodiments, the exhaust gas may include a diesel exhaust gas and the reductant may include a diesel exhaust fluid (e.g., the diesel exhaust fluid marketed under the name ADBLUE®) such as urea, an aqueous solution of urea, or any other fluid that includes ammonia. When aqueous urea solution is used for the reductant, the solution may include a particular ratio of urea to water. For example, in some embodiments, the ratio may be 32.5% by volume of urea and 67.5% by volume of deionized water, 40% by volume of urea and 60% by volume of deionized water, or any other suitable ratio of urea to deionized water. The reductant from the reductant storage tank 145 may be selectively inserted into the decomposition chamber by the reductant insertion assembly 150. The reductant insertion assembly 150 may include various structures to facilitate receipt of the reductant from the reductant storage tank 145 and delivery to the reductant port 155. For example, the reductant insertion assembly 150 may include, or be associated with to control, various pumps, valves, screens, filters, etc. that facilitate receiving the reductant from the reductant storage tank 145 and supplying that reductant to the reductant port 155.

Further, in some embodiments, the reductant may be inserted into the decomposition chamber in liquid form or in gaseous form. In some embodiments, the reductant port 155, and particularly the reductant injector associated with the reductant port, may be configured to inject the reductant in liquid form. In such embodiments, the reductant port 155 may constitute or be part of a "wet doser" or "liquid doser." In other embodiments, a vaporizer may be associated with the reductant port 155, the reductant injector, and/or the reductant insertion assembly 150 to vaporize or convert the liquid reductant into gaseous form before insertion into the housing 115. Whether inserted in liquid form or gaseous form, upon being injected into the decomposition chamber, the reductant undergoes evaporation, thermolysis, and/or hydrolysis to form gaseous ammonia, which is then mixed with the exhaust gas to form the exhaust gas-reductant mixture. The exhaust gas-reductant mixture may then flow over an SCR catalyst 160 of the SCR system 135.

The SCR catalyst 160 may be formulated to decompose certain constituents in the exhaust gas using the gaseous ammonia as a reagent in the presence of the SCR catalyst. Specifically, the SCR catalyst 160 causes the gaseous ammonia in the exhaust gas to catalyze, thereby reducing the NOx in the exhaust gas during the oxidation reaction. In some embodiments, the SCR catalyst 160 may include a metal-zeolite catalyst including, but not limited to Cu-CHA-Zeolite (e.g., a Cu-SSZ-13 catalyst), but also other zeolite structures including Cu-SAPO-34 catalyst, Cu-LTA, Cu-AEI, Cu-ZSM, Cu-beta, Cu-Chabazite, or any other suitable catalyst. In other embodiments, the SCR catalyst 160 may include a vanadium, an iron-zeolite, or a copper/iron-zeolite catalyst. In still other embodiments, the SCR catalyst 160 may include a multi-zone catalyst, for example, having a first zone including a copper-zeolite catalyst, and a second zone including an iron-zeolite catalyst, or vice versa. The SCR catalyst 160 may be disposed on a suitable substrate such as, for example, a ceramic (e.g., cordierite) or metallic (e.g., kanthal) monolith core which may, for example, define a honeycomb structure. In some embodiments, a washcoat may also be used as a carrier material for the SCR catalyst 160. Such washcoat materials may include, for example, aluminum oxide, titanium dioxide, silicon dioxide, any other suitable washcoat material, or a combination thereof. The monolith core may be securely positioned in a can to form the SCR system 135, which may be installed in the aftertreatment system 100. In some embodiments, the SCR system 135 may include a selective catalytic reduction filter (SCRF). The treated exhaust gas (e.g., treated to reduce constituents such as NOx gases, unburnt hydrocarbons, etc.) is expelled, via an outlet conduit 165, into the environment.

In some embodiments, a heater 170 may also be disposed within the housing 115. The heater 170 may be used to heat the exhaust gas to increase the efficiency of the aftertreatment system 100. In some embodiments, the heater 170 may be a resistive heater. In other embodiments, the heater 170 may be another type of an electric heater. In yet other embodiments, the heater may include any device or mechanism that may be used for heating exhaust gas. In some embodiments, the heater 170 may be configured as a pulse width modulated heater in that pulse width modulation may be used to control the heater. In other embodiments, the heater 170 may be controlled in other ways. Further, the positioning of the heater 170 may vary from one embodiment to another. For example, and as shown in FIG. 1, in some embodiments, the heater 170 may be positioned upstream of the oxidation catalyst 120.

In some embodiments, the heater 170 may be combined with or cross-coupled with (e.g., combined with) the oxidation catalyst 120. In other embodiments, the heater 170 may be positioned downstream of the oxidation catalyst 120. For example, in some embodiments, the heater 170 may be positioned between the oxidation catalyst 120 and the particulate filter 130. In other embodiments, the heater 170 may be positioned downstream of the particulate filter 130 and upstream of the SCR system 135. In some embodiments, the heater 170 may be combined with or cross-coupled with the particulate filter 130. In yet other embodiments, the heater 170 may be positioned within or cross-coupled with (e.g., combined with) the SCR system 135. In yet other embodiments, the heater 170 may be positioned within or cross-coupled with (e.g., combined with) the decomposition chamber 140, positioned upstream of the decomposition chamber, or positioned downstream of the decomposition chamber. Further, in some embodiments, more than one heater (e.g., the heater 170) located at different positons may be used.

Although the heater 170, oxidation catalyst 120, the particulate filter 130, the decomposition chamber 140, and the SCR system 135 have been described as being disposed within a single housing (e.g., the housing 115), in some embodiments, one or more of those components may be disposed in separate housings and connected together in operable association. Further, although a single instance of each of the heater 170, the oxidation catalyst 120, the particulate filter 130, the decomposition chamber 140, and the SCR system 135 has been described, in some embodiments, multiple instances of one or more of those elements may be provided within the aftertreatment system 100, if suitable.

Referring still to FIG. 1, the aftertreatment system 100 also includes a controller 175 that is configured to control operation of the various elements of the aftertreatment system 100 in treating the exhaust gas. For example, the controller 175 may be operably connected to the reductant insertion assembly 150 to instruct the reductant insertion assembly to selectively deliver the reductant from the reductant storage tank 145 to the reductant port 155. The controller 175 may also be operably connected to the reductant port 155 to selectively operate the reductant port to insert the reductant received from the reductant storage tank 145 into the decomposition chamber 140. Thus, the controller 175 may control the dosing rate of the reductant via the reductant insertion assembly 150 and the reductant port 155.

The controller 175 may also be configured to control the hydrocarbon insertion assembly 125 to selectively insert hydrocarbons into the oxidation catalyst 120 (e.g., when regeneration of the oxidation catalyst 120 and/or the particulate filter 130 is needed). In some embodiments, the selective insertion of hydrocarbons may also be used to increase the temperature of the exhaust gas. Thus, in some embodiments, the hydrocarbon insertion assembly 125 may be used in conjunction with the heater 170 to increase the temperature of the exhaust gas. In some embodiments, the controller 175 may be used to detect an increased oil consumption rate within the engine 105, as discussed in greater detail below. The controller 175 may likewise be connected to other elements of the aftertreatment system 100 that are controlled by the controller. The controller 175 may be operably coupled to the various components of the aftertreatment system 100 using any type and any number of wired and/or wireless connections. For example, in some embodiments, a wired connection such as a serial cable, a fiber optic cable, a CAT5 cable, etc. may be used to communicably connect the controller 175 to one or more elements of the aftertreatment system 100. In other embodiments, a wireless connection such as the Internet, Wi-Fi, cellular, radio, Bluetooth, ZigBee, etc. may be used. In some embodiments, a combination of wired and wireless connections may be used. Further, in some embodiments, a controller area network (CAN) bus may provide the exchange of signals, information, and/or data between the controller 175 and the various elements of the aftertreatment system 100.

The controller 175 may include or be associated with one or more processing units or processors. The processing unit(s) may include a microprocessor, programmable logic controller (PLC) chip, an application specific integrated circuit (ASIC), one or more field programmable gate arrays (FPGAs), a digital signal processor (DSP), a group of processing components, or other suitable electronic processing components. The processing unit(s) of the controller 175 may be configured to execute computer-readable instructions for performing the operations described herein. The processing unit(s) may be implemented in hardware, firmware, software, or any combination thereof. "Executing a computer-readable instruction" means that the processing unit(s) may perform operation(s) called for by that instruction. The processing unit(s) may retrieve the instruction from a memory associated with the controller 175 for execution and copy the instruction in an executable form to a physical memory. In some embodiments, the processing unit(s) may be configured to execute the instruction without first copying the instruction to the physical memory. The instruction may be written using one or more programming languages, scripting languages, assembly languages, etc. Thus, the controller 175, via its associated processing unit(s), may be configured to execute instructions, algorithms, commands, or programs stored in the memory associated with the controller.

Although a single controller (e.g., the controller 175) configured to control multiple elements (e.g., the reductant insertion assembly 150, the hydrocarbon insertion assembly 125, the heater 170, etc.) of the aftertreatment system 100 is shown, in some embodiments, separate controllers for one or more of those elements may be used. The controller 175 may include or be associated with other hardware, software, and/or firmware components that may be needed or considered useful to have in performing the functions described herein. In some embodiments, the controller 175 may be part of an electronic control unit (ECU) of the aftertreatment system 100. The controller 175 may be configured to control the reductant insertion assembly 150, the hydrocarbon insertion assembly 125, the heater 170, and any other element of the aftertreatment system 100 that is controlled by the controller based on data received from one or more sensors, such as sensors 180A, 180B, 180C, 180D, 180E, and 180F.

Each of the sensors 180A-180F may be configured to measure one or more conditions. For example, in some embodiments, the sensor 180A may be positioned within the engine and configured to measure one or more engine parameters (e.g., engine speed, engine temperature, engine load, vehicle speed, etc.). The sensor 180B may be positioned within the inlet conduit 110 to measure one or more parameters of the exhaust gas flowing through the inlet conduit, the sensors 180C and 180D may be configured to measure one of more parameters of the exhaust gas at the inlet and outlet, respectively, of the particulate filter 130, the sensor 180E may be configured to measure one or more parameters at the outlet of the SCR system 135, while the sensor 180F may be configured to measure one or more parameters in the exhaust gas flowing through the outlet conduit 165.

In some embodiments, one or more of the sensors 180A-180F may include a NOx sensor configured to measure an amount of NOx gases in the exhaust gas. In other embodiments, one or more of the sensors 180A-180F may include a temperature sensor to measure the temperature of the exhaust gas. In yet other embodiments, one or more of the sensor 180A-180F may include a pressure sensor, an oxygen sensor, a particulate matter sensor, an ammonia sensor (e.g., to determine ammonia slip), or any other sensor to measure a parameter that may be needed or considered desirable for the controller 175 to have in controlling the various elements of the aftertreatment system 100, and for achieving the target temperature at the inlet of the SCR system 135. Further, although a single sensor (e.g., the sensors 180A-180F) is shown in the various locations, in some embodiments, multiple sensors may be positioned at those locations. Further, in some embodiments, each of the sensors 180A-180F may be configured to measure a single parameter (e.g., temperature, NOx amount, etc.), while in other embodiments, each of those sensors may be configured to measure multiple parameters. Additionally, each of the sensor 180A-180F may be a physical sensor (e.g., a hardware device such as a thermistor) or a virtual sensor (e.g., based on a software model to determine the value of the parameter that the sensor is configured to measure).

Although the sensors 180A-180F have been shown in the aftertreatment system 100 as being positioned in specific locations, the positioning of those sensors may vary as suitable. For example, although the sensor 180C has been shown as being mounted at the inlet of the particulate filter 130, in some embodiments, that sensor may be positioned anywhere between the outlet of the oxidation catalyst 120 and the inlet of the particulate filter. Similarly, although the sensor 180D has been shown as being mounted at the outlet of the particulate filter 130, in some embodiments, that sensor may be mounted anywhere between the outlet of the particulate filter and the inlet of the SCR system 135. Similarly, the location of the other sensors may vary. Moreover, although only the sensors 180A-180F have been shown in FIG. 1, in other embodiments, additional sensors may be mounted in other locations as desired to enable the controller 175 to perform the functions described herein. Each of the sensors 180A-180F may be configured to collect data and transmit that data to the controller 175. Based on the collected data, the controller 175 may then control operation of the aftertreatment system 100.

Although certain components of the aftertreatment system 100 are shown and described in FIG. 1, the aftertreatment system may include other or additional elements that may be suitable. For example, in some embodiments, the aftertreatment system 100 may include an ammonia slip catalyst ("ASC") or ammonia oxidation catalyst ("AMOx") to reduce ammonia slip by which ammonia that is not catalyzed by the SCR catalyst 160 may be decomposed. In some embodiments, the aftertreatment system 100 may include mixers, baffle plates, secondary filters (e.g., a secondary partial flow or catalyzed filter), or any other component that may be needed or considered desirable in properly operating the aftertreatment system 100.

Figure 2:
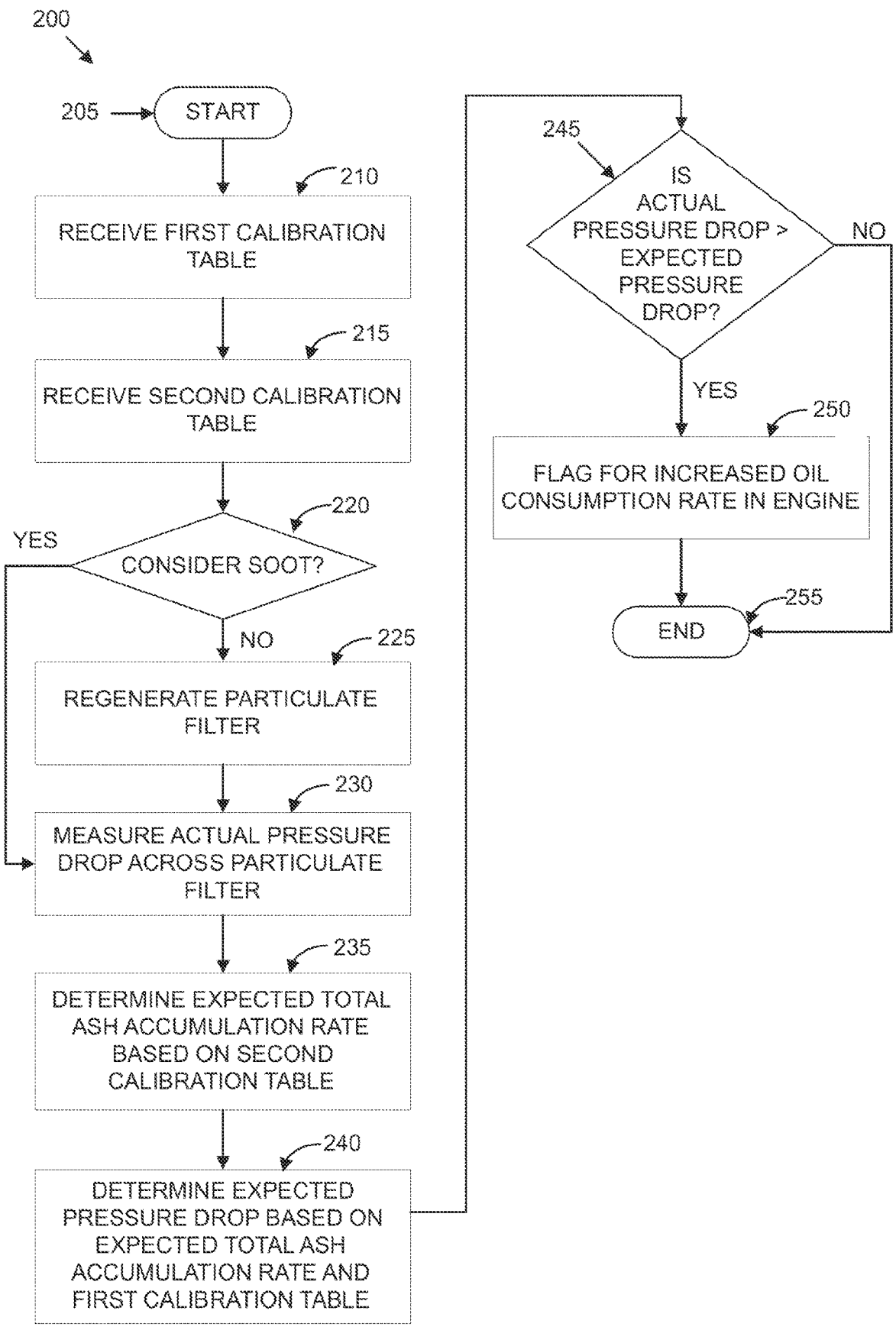
FIG. 2 is an example flowchart outlining operations for detecting an increased or abnormal oil consumption rate in an engine associated with the aftertreatment system of FIG. 1, in accordance with some embodiments of the present disclosure.

Turning to FIG. 2, an example flowchart outlining operations of a process 200 is shown, in accordance with some embodiments of the present disclosure. The process 200 may be used to detect an increased or abnormal oil consumption rate in the engine 105. An increased or abnormal oil consumption rate may be indicative of increased or excessive ash and/or soot loading or accumulation in the particulate filter 130. Oil consumption may be considered "increased" or "abnormal" if the rate of oil consumption (e.g., amount of oil consumed per unit of time) in the engine 105 exceeds a predetermined threshold or is greater than the oil consumption rate in an average (standard/healthy) engine. The excessive ash and/or soot accumulation may prevent an optimal operation of the engine 105. For example, excessive ash and/or soot accumulation may be indicative of wear and tear on certain components of the engine 105. Thus, by identifying the increased oil consumption rate in the engine 105, excessive accumulation of ash and/or soot in the particulate filter 130 may be identified and the particulate filter and/or worn engine components may be timely serviced/replaced to keep the engine 105 operating optimally.

The process 200 may be implemented by the controller 175. Thus upon starting at operation 205, the controller 210 receives a first calibration table. In some embodiments, the first calibration table may be compiled in a tabular or other form. In some embodiments, the first calibration table may be an ash loaded calibration table. In other embodiments, the first calibration table may be a soot and ash loaded calibration table (e.g., a delta pressure soot loaded estimate table (DPSLE)). The ash loaded calibration table and the soot and ash loaded calibration table may correlate the ash accumulation rate or soot and ash accumulation rate, respectively, with a pressure drop across the particulate filter 130. For example, the ash loaded calibration table may be configured to correlate pressure drop across the particulate filter 130 with the ash accumulation rate in the particulate filter. In some embodiments, as the ash accumulation rate in the particulate filter 130 increases, the pressure drop across the particulate filter increases. Similarly, in some embodiments, the soot and ash loaded calibration table may be configured to correlate pressure drop across the particulate filter 130 with the ash and soot accumulation rate in the particulate filter. In some embodiments, as the soot and ash accumulation rate in the particulate filter 130 increases, the pressure drop across the particulate filter increases.

Further, in some embodiments, the ash loaded calibration table and the soot and ash loaded calibration table may be created by testing (e.g., transient testing) and/or modeling the operation of an average (e.g., standard/healthy/normally operating) engine 105 to measure the pressure drop across the particulate filter 130 for various levels of ash and/or soot accumulation rates and exhaust gas flow rates. For example, to create the ash loaded calibration table, the pressure drop across a clean particulate filter (e.g., the particulate filter 130) may be measured. In some embodiments, the pressure drop across the particulate filter 130 may be measured by measuring the pressure at which the exhaust gas enters the particulate filter (e.g., inlet pressure) and the pressure at which the exhaust gas exists the particulate filter (e.g., outlet pressure), and computing a difference between the outlet and inlet pressures.

Upon measuring the pressure drop across a clean particulate filter (e.g., a particulate filter with no ash and no soot, or ash and/or soot below a predetermined threshold), the particulate filter 130 may be filled with plaster of Paris to mimic ash accumulation rate on the particulate filter 130 during the operation of an average engine. Various amounts of the plaster of Paris may be filled to mimic various rates of ash accumulation and exhaust gas flow rates during the operation of an average engine. For each ash accumulation rate (e.g., an amount of ash accumulation per unit of time), the pressure drop across the particulate filter 130 may be measured. Based on the measured pressure drop and the corresponding ash accumulation rate, a calibration table (e.g., the ash loaded calibration table) may be developed. The ash loaded calibration table may, thus, include a plurality of ash accumulation rates and the corresponding pressure drops across the particulate filter 130 for various exhaust gas flow rates. In other embodiments, the ash loaded calibration table may be created in other ways. For example, in some embodiments, field return parts from actual testing may be used to create the ash loaded calibration table. In some embodiments, artificial ash loading with a surrogate powder (e.g., calcium sulfate, etc.), blowing in ash from field return parts, and other mechanisms may be used for creating the ash loaded calibration table.

Similarly, in some embodiments, an ash and soot loaded calibration table may be developed. While the ash loaded calibration table considers only ash accumulation rate in the particulate filter 130, the ash and soot loaded calibration table considers both ash and soot accumulation rates in the particulate filter. In some embodiments, the soot and ash loaded calibration table may be created in a similar manner as the ash loaded calibration table, with the amount of plaster of Paris used (or another mechanism) mimicking both ash and soot accumulation rate. In other embodiments, plaster of Paris may be used to mimic ash accumulation rate and another element may be used to mimic the soot accumulation rate in the particulate filter 130. An example of creating a soot and ash loaded calibration table, particularly during low or idle operation is discussed in U.S. Pat. No. 10,273,858, filed on Dec. 2, 2015, the entirety of which is incorporated by reference herein. The soot and ash loaded calibration table may, thus, include a plurality of soot and ash accumulation rates and the corresponding pressure drops across the particulate filter 130 for various exhaust gas flow rates.

Upon creating the ash loaded calibration table and the soot and ash loaded calibration table, those tables may be input into the controller 175. In some embodiments, the ash loaded calibration table and the soot and ash loaded calibration table may be tuned and updated periodically, and the updated tables may replace the old tables input into the controller 175. Thus, at the operation 210, the controller 175 receives the first calibration table (e.g., the ash loaded calibration table and/or the soot and ash loaded calibration table).

At operation 215, the controller 175 receives a second calibration table. The second calibration table may include estimated oil consumption rates in the engine 105 and corresponding ash accumulation rates in the particulate filter 130 of an average (e.g., standard/healthy/normally operating) engine. In some embodiments, the ash/soot accumulation rates as determined by the first calibration table of the operation 210 may be prone to variations. For example, in some embodiments, the amount of ash accumulation may vary based on engine operation. Some engine operations may lead to more ash accumulation than other engine operations. In some embodiments, the engine speed, load, duty cycles may also impact the amount of ash accumulation. In some embodiments, as certain engine components wear, the amount of ash depositing in the particulate filter 130 may increase. Similarly, other factors may impact the ash accumulation in the particulate filter 130. The ash loaded calibration table and the soot and ash loaded calibration table which are configured based on exhaust flow rate and pressure drop across the particulate filter 130 do not account for such other factors that may impact ash accumulation.

Thus, in some embodiments, to improve the accuracy of the ash loaded calibration table and the soot and ash loaded calibration table, a correction factor may be used. The correction factor may be used to accurately determine (or at least increase the accuracy of) ash accumulation in the particulate filter 130. In some embodiments, the correction factor may be based on the second calibration table. Generally speaking, the oil used in the engine (e.g., engine oil) 105 may have some ash content. As the oil burns, majority of the ash from the oil escapes and deposits in the particulate filter 130. In some embodiments, the oil consumption rate may be indicative of one or more factors that may impact the ash accumulation rate in the particulate filter 130. For example, as components of the engine 105 wear, the oil consumption rate increases. Further, as the engine load, engine speed, etc. increases, the oil consumption rate increases. As the oil consumption rate increases, the ash accumulation rate in the particulate filter 130 increases as well, and vice-versa. Thus, in some embodiments, by detecting increased or abnormal oil consumption rates, increased or excessive ash and/or soot accumulation in the particulate filter 130 may be detected.

Figure 3:
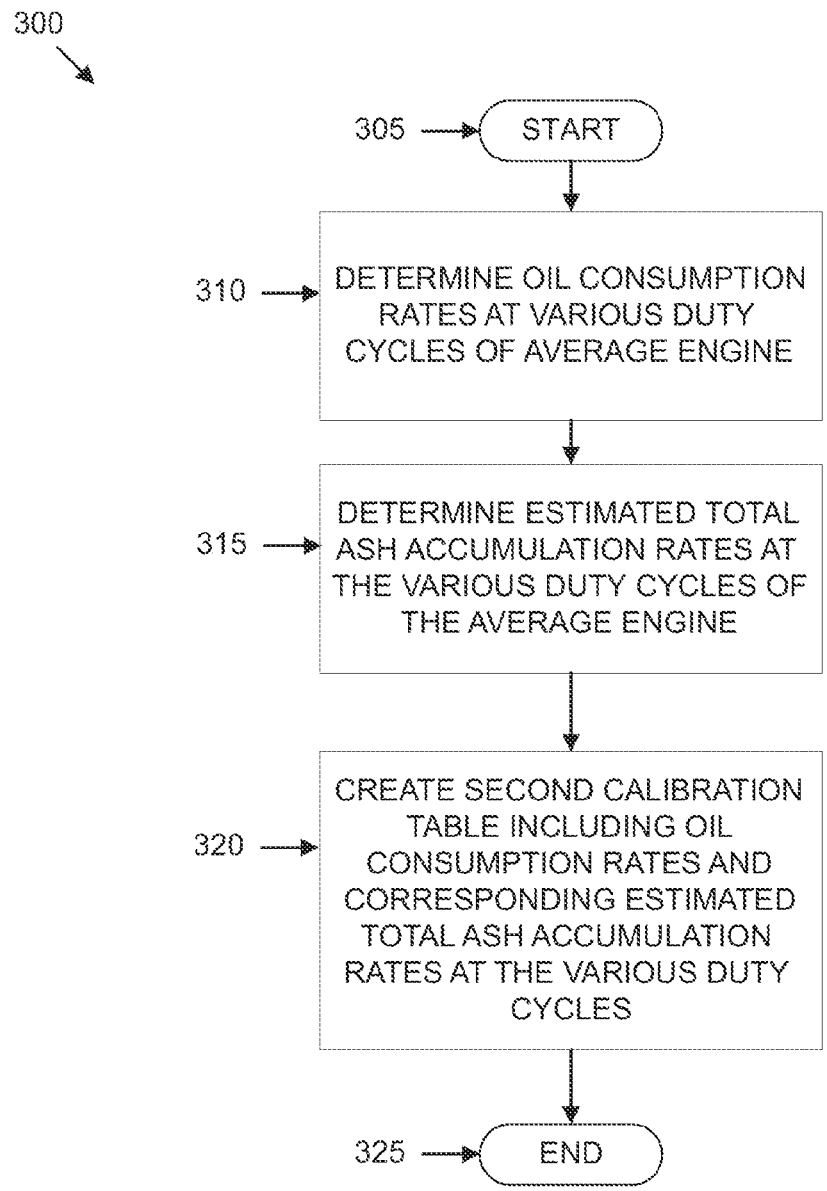
FIG. 3 is an example flowchart outlining operations for creating a second calibration table for use in the process of FIG. 2, in accordance with some embodiments of the present disclosure.

Therefore, at the operation 215, the second calibration table is created and received by the controller 175. In some embodiments, the second calibration table may be compiled in a tabular or other form. In some embodiments, the second calibration table may be based on the duty cycle of the engine 105. For example, in some embodiments, for various duty cycles of the engine 105, the corresponding estimated oil consumption rates may be determined. For each duty cycle, the estimated total ash accumulation rates in the particulate filter 130 may also be determined. The second calibration table may then include various estimated oil consumption rates and corresponding estimated total ash accumulation rates for each duty cycle. FIG. 3 explains the creation of the second calibration table. Upon receiving the second calibration table at the operation 215, at operation 220, the controller 175 determines if soot accumulation is to be considered in identifying the increased or abnormal the oil consumption rate.

Soot is carbon based and may be burned off at higher temperatures. For example, by regenerating the particulate filter 130 (e.g., by increasing the temperature across the particulate filter), the soot on the particulate filter may be burned off. Ash is inorganic in nature and may not be burned off at higher temperatures. Thus, ash in general cannot be removed by regenerating the particulate filter 130. In some embodiments, a replacement of the particulate filter 130 or removing the particulate filter to clean the deposited ash may be needed. In some embodiments, increased or abnormal oil consumption rate may be desired to be determined based only on ash accumulation. In other embodiments, increased or abnormal oil consumption rate may be desired to be determined based on both ash and soot. Thus, at the operation 220, the controller 175 determines whether soot accumulation is to be considered in the determination of the increased or abnormal oil consumption rate.

In some embodiments, the controller 175 may be preprogrammed to determine the oil consumption rate with or without the soot accumulation. In other embodiments, the controller 175 may receive a user input indicating whether to consider soot accumulation in the increased or abnormal oil consumption rate determination. In other embodiments, the controller 175 may determine whether soot accumulation is to be considered in other ways. If the controller 175 determines that increased or abnormal oil consumption rate is to be determined without taking soot accumulation into consideration, at operation 225, the particulate filter 130 is regenerated to remove the soot from the particulate filter. As indicated above, the particulate filter 130 may be regenerated in some embodiments by increasing the temperature across the particulate filter. In some embodiments, the temperature across the particulate filter 130 may be increased by heating the exhaust gas (e.g., using the heater 170), by injecting additional fuel into the exhaust gas (e.g., using the hydrocarbon insertion assembly 125), or in any other way. In some embodiments, the particulate filter 130 may be regenerated in other ways.

If, at the operation 220, the controller 175 determines that soot accumulation is to be considered in determining the oil consumption rate, the particulate filter 130 is not regenerated and the process 200 proceeds to operation 230. Thus, the operation 230 is reached from the operation 225 if the soot accumulation is not to be considered or directly from the operation 220 if the soot accumulation is to be considered in determining increased or abnormal oil consumption rate. At operation 230, the controller 175 measures the actual pressure drop across the particulate filter 130. In some embodiments, the controller 175 may measure the actual pressure of the exhaust gas at the inlet of the particulate filter 130 (e.g., inlet pressure) using the sensor 180C. Similarly, in some embodiments, the controller 175 may measure the actual pressure of the exhaust gas at the outlet of the particulate filter 130 (e.g., outlet pressure) using the sensor 180D. The controller 175 may then compute a difference between the inlet pressure and the outlet pressure to determine the actual pressure drop (also referred to herein as back pressure) across the particulate filter 130.

At operation 235, the controller 175 determines the expected total ash accumulation rate (e.g., the amount of ash accumulating per unit of time) in the particulate filter 130 during operation of the engine 130. In some embodiments, the expected total ash accumulation rate may be determined based on the second calibration table of the operation 215. For example, in some embodiments, the controller 175 may determine the current duty cycle of the engine 105 (e.g., the duty cycle of the engine when the process 200 is executed). Based on the current duty cycle of the engine 105, the controller 175 may determine the expected total ash accumulation rate. The process for determining the expected total ash accumulation rate is discussed in greater detail below with reference to FIG. 4.

Upon determining the expected total ash accumulation rate at the operation 235, the controller 175 computes an expected pressure drop across the particulate filter 130 at operation 240. Specifically, in some embodiments, the controller 175 determines the expected pressure drop based on the first calibration table of the operation 210. In some embodiments, if soot accumulation is being considered (e.g., as determined at the operation 220), the ash and soot loaded calibration table may be used for determining the expected pressure drop. If only ash accumulation is being considered (e.g., as determined at the operation 220), then the ash loaded calibration table may be used to determine the expected pressure drop. To determine the expected pressure drop from either the ash loaded calibration table or the soot and ash loaded calibration table, the controller 175 maps the expected total ash accumulation rate from the operation 235 to the corresponding pressure drop. In other words, the controller 175 may perform a look-up in the first calibration table of the expected total ash accumulation rate and determine the pressure drop corresponding to (or nearest to) the expected total ash accumulation rate.

At operation 245, the controller 175 compares the expected pressure drop determined at the operation 240 with the measured actual pressure drop of the operation 230. If the actual pressure drop is greater than the expected pressure drop, the controller 175 determines that the engine has an increased or abnormal oil consumption rate at operation 250. In some embodiments, the controller 175 may raise an alert or flag to indicate the increased or abnormal oil consumption rate. As discussed above, an increased or abnormal oil consumption rate may be indicative of increased or excessive ash and/or soot accumulation in the particulate filter 130. The alert or flag may be an indication to a user to service or replace the particulate filter 130. The alert or flag may also be an indication to a user that certain parts of the engine 105 may be wearing and need to be serviced. Thus, the engine 105 may be serviced to avoid damage and shortened lifetime of the particulate filter 130 and any impacted components. The timely diagnosis of excessive ash and/or soot accumulation may also avoid increased oil consumption rate, which may lead to reduced operation of the particulate filter 130 and increased cost of oil that may need to be more frequently replenished. In some embodiments, the flag or alert may be provided via a telematics communication on a dashboard or other electronic device within the vehicle. In some embodiments, the alert or flag may be sent to a fleet manager or another personnel.

If, at the operation 245, the controller 175 determines that the actual pressure drop is less than or equal to the expected pressure drop, the controller determines that the oil consumption rate is normal. The process 200 ends at operation 255. In some embodiments, the process 200, and at least the operations 225-250, may be repeated periodically or upon satisfaction of certain conditions. For example, in some embodiments, the process 200 may be repeated each time an updated first calibration table or second calibration table is input into the controller 175. In some embodiments, the process 200 may be repeated after a vehicle has driven a designated number of miles or for a designated period of time. In some embodiments, the process 200 may run upon each cleaning, regeneration, or replacement of the particulate filter 130. In some embodiments, the process 200 may be run on demand. In yet other embodiments, the process 200 or at least a portion of the process 200 may be executed upon satisfaction of other conditions. Thus, in some embodiments, the process 200 may be used for diagnostic monitoring to determine excessive ash and/or soot accumulation in the particulate filter 130 in real time or substantial real time.

Referring now to FIG. 3, an example flowchart outlining operations of a process 300 is shown, in accordance with some embodiments of the present disclosure. The process 300 may be used to create the second calibration table of the operation 215. In some embodiments, the process 300 may be implemented by the controller 175. As indicated above, the oil consumption rate increases as the ash accumulation rate increases, and vice-versa. In some embodiments, reference or estimated oil consumption rate (e.g., amount of oil consumption per unit time) may be measured over standard duty cycles of an average (e.g., healthy, standard, normally operating) engine. The engine 105 may be considered "average" if the particulate filter has no ash and/or soot accumulation or the ash and/or soot accumulation rate is below a predetermined threshold. Further, in some embodiments, the ash accumulation rate in the particulate filter 130 may also be measured for the standard duty cycles.

Figure 5A:
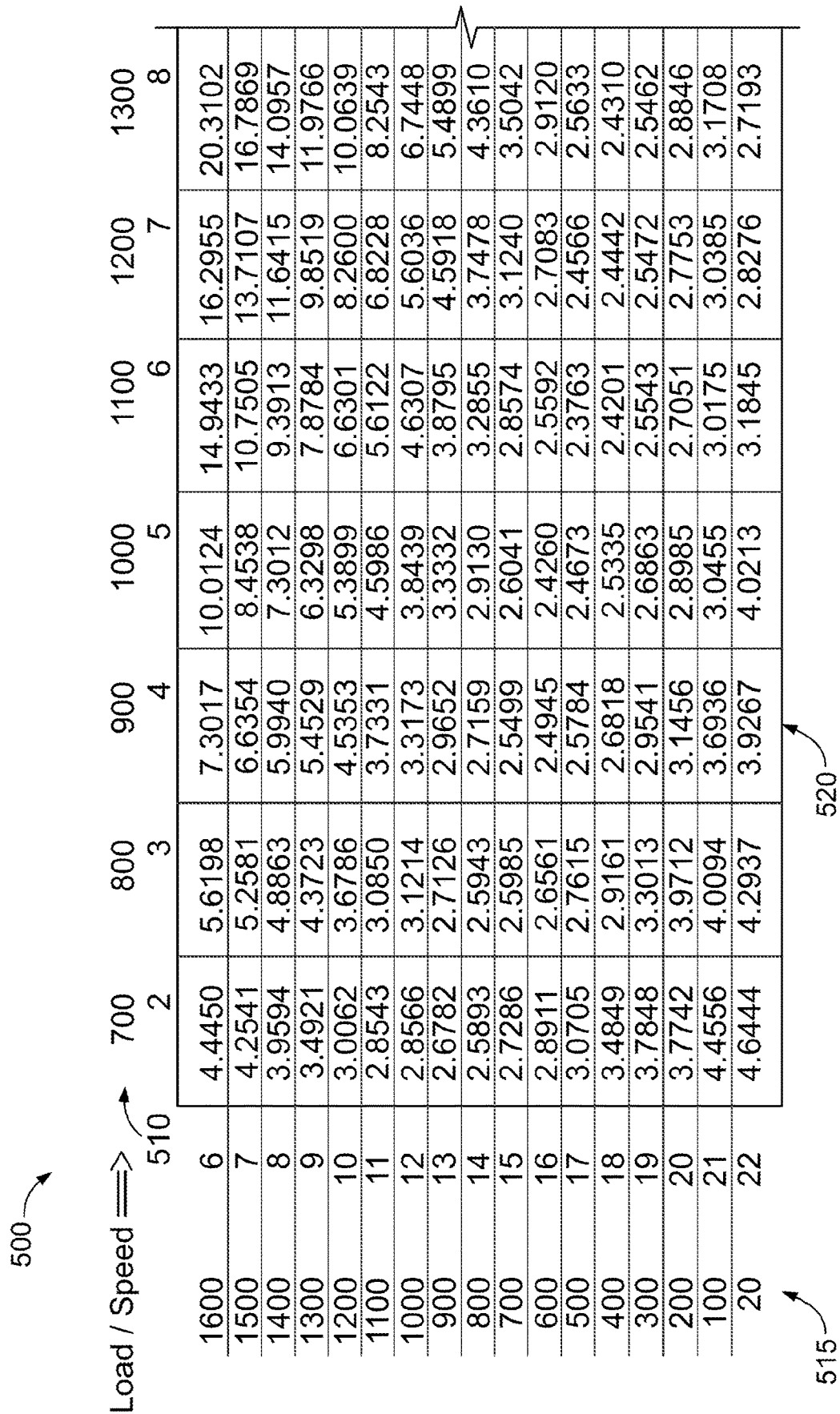
FIG. 5A is an example table between duty cycles and an oil consumption rate, in accordance with some embodiments of the present disclosure.

Thus, upon starting at operation 305, the controller 175 determines the oil consumption rate at various standard duty cycles at operation 310. In some embodiments, the "duty cycle" of the engine 105 may be a function of engine speed and work load conditions over which the engine operates in a specific application. Thus, in some embodiments, the standard duty cycle may be dependent upon the engine speed and work load. In some embodiments, the standard duty cycles may be classified as low, medium, and high duty cycles. In some embodiments, whether a duty cycle is classified as low, medium, or high may be dependent upon the engine speed (e.g., in Revolutions Per Minute (RPM)) and work load (e.g., torque—measured in Newton-Meter). In some embodiments, an engine speed of greater than a first threshold and/or a work load of greater than a second threshold may be classified as a high duty cycle. In some embodiments, an engine speed of greater than a third threshold but lesser than the first threshold and/or a work load of greater than a fourth threshold but less than the second threshold may be classified as a medium duty cycle. In some embodiments, an engine speed of less than the third threshold and/or a work load less than the fourth threshold may be classified as a low duty cycle. For example, in some embodiments, the engine speed and/or work load during a highway cruise or pick-up and delivery may be considered a low duty cycle. A standard mixed city and highway transient cycles (e.g., Federal Transient Protocol Cycles or World Harmonized Transient Cycles) may be considered a medium duty cycle, while high payload cycles (e.g., Ramped Mode Cycles, World Harmonized Stationary Cycles, etc.) may be considered high duty cycles. In other embodiments, the oil consumption rate may be determined using steady-state duty cycle testing (an example of which is shown in FIG. 5A) including discrete duty cycles. Thus, the controller 175 may receive the various duty cycles over which the oil consumption rate is to be determined.

Further and in general, as the engine speed increases, the oil consumption rate increases. Similarly, as the work load increases, the oil consumption rate increases. Thus, at the operation 310, the estimated oil consumption rate of an average engine is measured over the various duty cycles (e.g., the low, medium, and high duty cycles) over which the estimated oil consumption rate is to be measured. In some embodiments, the estimated oil consumption rate may be measured by using a dip stick and fill back to a consistent fill level to measure how much oil is being added to the average engine. The estimated oil consumption rate may be used as a measure for normal engine operation. A measured oil consumption rate may be measured against the estimated oil consumption rate for determining an increased oil consumption rate and flagging the engine for service. The estimated oil consumption rate may be input into the controller 175. The average engine that is used to determine the estimated oil consumption rate over the various duty cycles may be considered a "test cell." In other embodiments, the estimated oil consumption rate may be determined in other ways. Thus, at the operation 310, the controller 175 receives the various duty cycles and the estimated oil consumption rates for those duty cycles, and creates a first table of estimated oil consumption rates at various duty cycles. In some embodiments, the first table may include an estimated oil consumption rate for a plurality of engine speeds and a plurality of workloads. An example of the first table is shown in FIG. 5A.

Figure 5B:
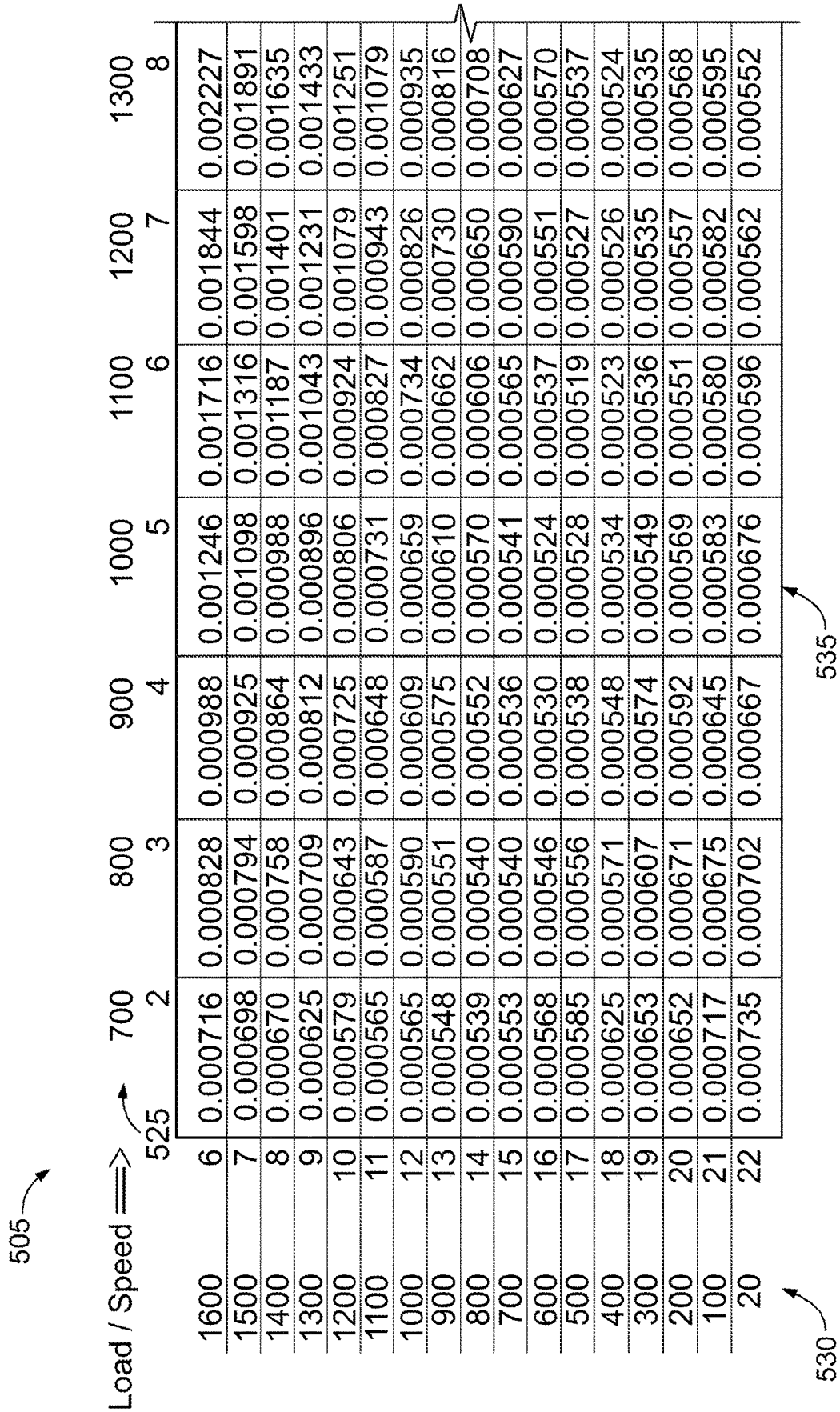
FIG. 5B is an example table between duty cycles and an ash accumulation rate, in accordance with some embodiments of the present disclosure.

At operation 315, the controller 175 determines an estimated ash accumulation rate over various standard duty cycles in the test cell. Specifically, for each duty cycle for which the estimated oil consumption rate is determined at the operation 310, the estimated ash accumulation rate for that duty cycle may also be determined (e.g., by extended testing (e.g., >50 hours)). In some embodiments, the estimated ash accumulation rate may be determined by weighing the particulate filter 130. In some embodiments, the particulate filter 130 may be regenerated to remove any deposited soot before weighing to get a more accurate measurement of ash accumulation. In some embodiments, the weight of a clean particulate filter (e.g., without a new particulate filter) may be subtracted from the total weight of the particulate filter 130 with the ash deposit to achieve the total weight of the ash accumulated on the particulate filter 130. Thus, the particulate filter 130 may be weighed before ash loading, then loaded with ash, and weighed again. The increased weight may be determined from the increased weight of the particulate filter 130 due to the ash loading. Thus, from the total weight of ash accumulation, the estimated ash accumulation rate may be determined (e.g., in grams per mile). Thus, for each duty cycle for which the estimated oil consumption rate is determined, the estimated ash accumulation rate may be also determined. The estimated ash accumulation rate may be input into the controller 175. In some embodiments, the fuel (e.g., diesel) may also contribute to ash accumulation in the particulate filter 130. Thus, in some embodiments, an additional ash content may be added to the estimated ash accumulation rate to account for the ash contribution from fuel. In some embodiments, the ash accumulation rate generated from fuel for each duty cycle may be known. The ash accumulation rate from fuel for each duty cycle may be input into the controller 175. Thus, in some embodiments, an estimated total ash accumulation rate for each duty cycle may be a sum of the estimated ash accumulation due to oil consumption and the ash accumulation rate due to fuel. Upon computing the estimated total ash accumulation rate, the controller 175 may create a second table of the various duty cycles and the corresponding estimated total ash accumulation rates. In some embodiments, for a plurality of engine speed and a plurality of workloads, the second table may include a corresponding estimated total ash accumulation rate. An example of the second table is shown in FIG. 5B.

At operation 320, the controller 175 creates a third table of the estimated oil consumption and the estimated total ash accumulation rate at various duty cycles. The first table from the operation 310 is between various duty cycles and the estimated oil consumption rate. The second table from the operation 315 is between the same duty cycles as those used in the first table and the estimated total ash accumulation rate. The controller 175 then correlates the first and second tables to create the second calibration table including the estimated oil consumption rate and the corresponding estimated total ash accumulation rate for each duty cycle (e.g., various low, medium, high duty cycles). In some embodiments in which the first and second table are created for low, medium, and high duty cycles, the third table may not be needed. In some embodiments, the third table may be a conversion table for duty cycle severity to oil consumption rate. For example, in some embodiments, if the first and second tables are created based on steady state duty cycles, the third table may translate the steady state duty cycles to low, medium, and high duty cycles. For example, in some embodiments, the oil consumption rate may be directly calculated by averaging oil consumption rate at each second based on the speed and/or work load (e.g., torque) over a period of time. In some embodiments, the calibration may sum the total oil consumption rate using speed and/or work load at each second individually. In some embodiments, the second table and the third table (when created) may be created simultaneously or the third table may be created before or after the second table.

The second calibration table of FIG. 3 may then be used to determine the expected total ash accumulation at the operation 235, as discussed in greater detail below with reference to FIG. 4.

In some embodiments, a duty cycle severity scale may be established using speed and torque to measure the relationship between the oil consumption rate and the speed/torque during the design process. In some embodiments, the controller 175 may use this relationship to add a weighting factor to the estimated ash accumulation (and thus oil consumption) rate to account for possible differences in vehicle operation or mixed duty cycles. For example, in some embodiments, the weighting factor may be based on light, normal, severe duty cycles and may equate to about 50%, 100%, and 150% ash accumulation rates, respectively. In some embodiments, the weighting factor may particularly be useful during mixed duty cycles. For example, a vehicle may be switching between various duty cycles during operation. Thus, an operation of the vehicle may include mixed duty cycles. In such cases, a weighting factor may be used to reflect the mixed duty cycles. Cumulative ash accumulation may be tracked continuously (summation) as a function of vehicle speed and/or hours of operation. In some embodiments, the weighting factor may be an interpolation between the low, medium, and high duty cycles by using engine work (e.g., speed/torque) over a period of time. For example, in some embodiments, if a low duty cycle is defined as 10 horsepower-hour, a medium duty cycle is defined as 20 horsepower-hour, and high duty cycle is defined as 30 horsepower-hours, and each of these duty cycles have an oil (and ash) consumption rate associated therewith, if the current duty cycle of the engine 105 is 15 horsepower-hour, the oil consumption rate may be an average of the oil consumption rate corresponding to the low duty cycle and the medium duty cycle (because the current duty cycle falls between the low and medium duty cycles). In other embodiments, functions other than average may be used for the weighting factor to determine oil consumption arte for mixed duty cycles.

Figure 4:
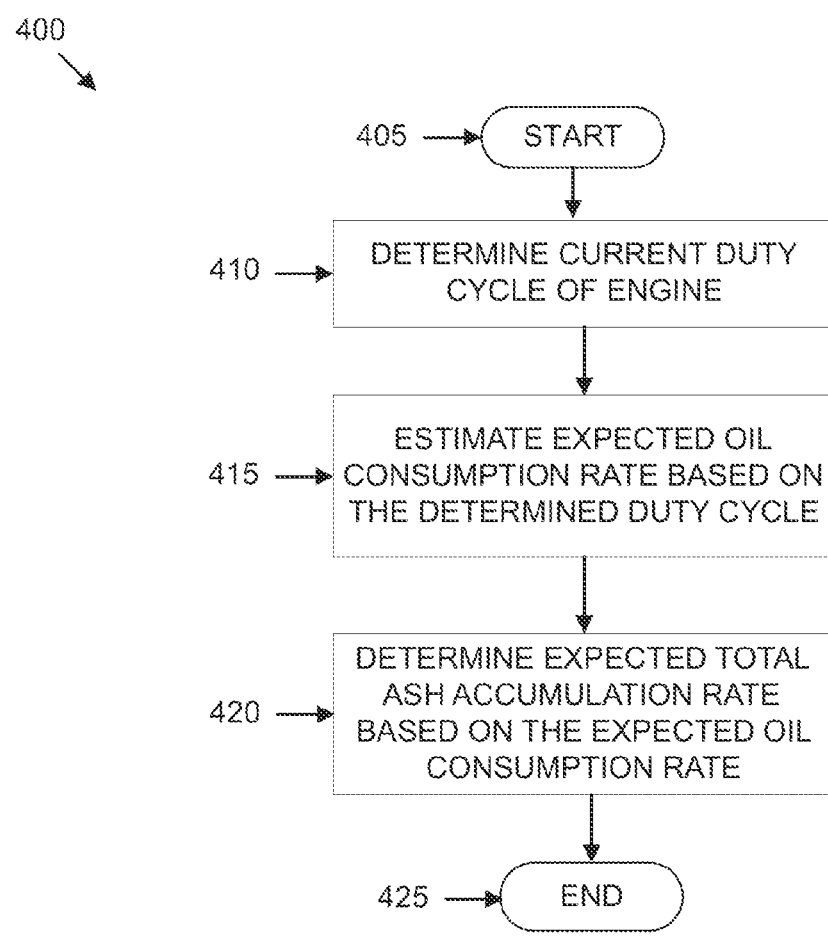
FIG. 4 is an example flowchart outlining operations for determining an expected total ash accumulation rate for use in the process of FIG. 2 based on the second calibration table of FIG. 3, in accordance with some embodiments of the present disclosure.

Turning now to FIG. 4, an example flowchart outlining operations of a process 400 is shown, in accordance with some embodiments of the present disclosure. The process 400 may be used to determine the expected total ash accumulation rate during operation of the engine at the operation 235. The process 400 may be implemented by the controller 175. Thus, upon starting at operation 405, the controller 175 determines the current duty cycle of the engine 105 at operation 410. In some embodiments, the engine 105 may have one or more sensors that may be used to determine the duty cycle of the engine. In other embodiments, the controller 175 may measure the engine speed of the engine 105, as well as the torque in the engine to determine work load. Based on the engine speed and torque, the controller 175 may determine the duty cycle.

At operation 415, the controller 175 determines the expected oil consumption rate based on the determined duty cycle of the operation 410. Specifically, in some embodiments, the controller 175 estimates the expected oil consumption rate based on the percent of time spent in the low, medium, and high duty cycles. For example, in some embodiments, the controller 175 may determine the engine speed and/or work load from the current duty cycle, and use the engine speed and/or work load to identify the oil consumption rate from the first table of the operation 310 that corresponds to that engine speed and/or work load. At operation 420, the controller 175 determines the expected total ash accumulation rate from the determined oil consumption rate. Specifically, the controller 175 may estimate the ash loading rate based on the oil consumption rate either via directly measured values or historically established rates. For example, in some embodiments, the controller 175 may refer to the third table of the operation 320 to look up the estimated total ash accumulation rate corresponding to the expected oil consumption rate determined at the operation 415. In some embodiments, instead of separate operations 415 and 420, the controller 175 may determine the expected total ash accumulation rate from the second table by identifying the estimated total ash accumulation rate corresponding to the current duty cycle of the engine 105. The process 400 ends at operation 425.

Referring to FIGS. 5A and 5B, example tables between duty cycles (e.g., engine speeds and workloads) and estimated oil consumption rate and estimated total ash accumulation rate are shown, in accordance with some embodiments of the present disclosure. Specifically, FIG. 5A shows an example table 500 (e.g., the first table of the operation 310) between duty cycles and estimated oil consumption rate, while FIG. 5B shows an example table 505 (e.g., the second table of the operation 315) between duty cycles and the estimated total ash accumulation rate. Referring specifically to FIG. 5A, the table 500 shows engine speed in RPM on X-axis 510 and work load in torque on Y-axis 515. Values 520 in the table 500 correspond to the estimated oil consumption rate. Thus, for a particular engine speed and work load, the estimated oil consumption rate may be determined from the table 500. Referring specifically to FIG. 5B, the table 505 shows engine speed in RPM on X-axis 525 and work load in torque on Y-axis 530. The values on the X-axis 525 are same as the values on the X-axis 510, and the values on the Y-axis 530 are same as the values on the Y-axis 515. Values 535 in the table 505 correspond to the estimated total ash accumulation rate. Thus, for a particular engine speed and work load, the estimated total ash accumulation rate may be determined from the table 505.

Thus, the present disclosure utilizes pressure drop across the particulate filter 130 and predicted ash and soot (or ash only) loading response from the calibration tables to determine when engine operation components may be wearing, or engine operation may be abnormal.

The controller 175 may compare the pressure drop signature over time against the tuned calibration tables to determine when ash accumulation rate is excessive, which may then be used to flag potential engine (e.g., cylinder) issues that increase oil consumption before full service of the particulate filter 130 may be required.

Therefore, in some embodiments, the present disclosure provides an aftertreatment system having a particulate filter configured to receive exhaust gas from an engine and a controller that executes computer-readable instructions stored on a memory to determine an actual pressure drop across a particulate filter based on pressure measurements across the particulate filter, determine an expected total ash accumulation rate in the particulate filter based on a current duty cycle of the engine, determine an expected pressure drop across the particulate filter based on the expected total ash accumulation rate, compare the expected pressure drop with the actual pressure drop, and determine whether an oil consumption rate in the engine is abnormal based on the comparison.

In some embodiments, the controller further executes computer-readable instructions to determine the expected pressure drop based on a first calibration table. In some embodiments, the first calibration table comprises a soot and ash loaded calibration table comprising a plurality of pressure drops across a test particulate filter and a corresponding soot and ash accumulation rate in the test particulate filter at each of the plurality of pressure drops. In some embodiments, the first calibration table comprises an ash loaded calibration table comprising a plurality of pressure drops across a test particulate filter and a corresponding ash accumulation rate in the test particulate filter at each of the plurality of pressure drops.

In some embodiments, the controller further executes computer-readable instructions to determine the expected total ash accumulation rate based on the first calibration table and a second calibration table. In some embodiments, the first calibration table comprises a plurality of pressure drops across a test particulate filter and a corresponding first ash accumulation rate or a soot and ash accumulation rate in the test particulate filter at each of the plurality of pressure drops, and wherein the second calibration table comprises a plurality of duty cycles and a corresponding second ash accumulation rate at each of the plurality of duty cycles. In some embodiments, the first calibration table comprises a plurality of pressure drops across a test particulate filter and a corresponding first ash accumulation rate or a soot and ash accumulation rate in the test particulate filter at each of the plurality of pressure drops, and wherein the second calibration table comprises a plurality of duty cycles and a corresponding estimated oil consumption rate at each of the plurality of duty cycles. In some embodiments, the second calibration table further comprises an additional calibration table comprising a corresponding second ash accumulation rate corresponding to the estimated oil consumption rate at each of the plurality of duty cycles.

In some embodiments, the controller further executes computer-readable instructions to determine that that the oil consumption rate in the engine is abnormal based on the actual pressure drop being greater than the expected pressure drop, and that the oil consumption rate in the engine is not abnormal based on the actual pressure drop being less than or equal to the expected pressure drop.

The present disclosure also provides a method comprising determining, by a controller of an aftertreatment system, an actual pressure drop across a particulate filter configured to receive exhaust gas from an engine based on pressure measurements across the particulate filter, determining, by the controller, an expected total ash accumulation rate in the particulate filter based on a current duty cycle of the engine, determining, by the controller, an expected pressure drop across the particulate filter based on the expected total ash accumulation rate, comparing, by the controller, the expected pressure drop with the actual pressure drop, and determining, by the controller, whether an oil consumption rate in the engine is abnormal based on the comparison.

In some embodiments, the method further comprises determining, by the controller, the expected pressure drop based on a first calibration table. In some embodiments, the first calibration table comprises a soot and ash loaded calibration table comprising a plurality of pressure drops across a test particulate filter and a corresponding soot and ash accumulation rate in the test particulate filter at each of the plurality of pressure drops. In some embodiments, the first calibration table comprises an ash loaded calibration table comprising a plurality of pressure drops across a test particulate filter and a corresponding ash accumulation rate in the test particulate filter at each of the plurality of pressure drops.

In some embodiments, the method further comprises determining, by the controller, the expected total ash accumulation rate based on the first calibration table and a second calibration table. In some embodiments, the first calibration table comprises a plurality of pressure drops across a test particulate filter and a corresponding first ash accumulation rate or a soot and ash accumulation rate in the test particulate filter at each of the plurality of pressure drops, and wherein the second calibration table comprises a plurality of duty cycles and a corresponding second ash accumulation rate at each of the plurality of duty cycles. In some embodiments, the first calibration table comprises a plurality of pressure drops across a test particulate filter and a corresponding first ash accumulation rate or a soot and ash accumulation rate in the test particulate filter at each of the plurality of pressure drops, and wherein the second calibration table comprises a plurality of duty cycles and a corresponding estimated oil consumption rate at each of the plurality of duty cycles. In some embodiments, the second calibration table further comprises an additional calibration table comprising a corresponding second ash accumulation rate corresponding to the estimated oil consumption rate at each of the plurality of duty cycles.

In some embodiments, the method further comprises determining, by the controller, that the oil consumption rate in the engine is abnormal based on the actual pressure drop being greater than the expected pressure drop, and that the oil consumption rate in the engine is not abnormal based on the actual pressure drop being less than or equal to the expected pressure drop.

The present disclosure also provides a non-transitory computer-readable media comprising computer-readable instructions stored thereon that when executed by a controller of an aftertreatment system causes the controller to perform a process comprising determining an actual pressure drop across a particulate filter configured to receive exhaust gas from an engine based on pressure measurements across the particulate filter, determining an expected total ash accumulation rate in the particulate filter based on a current duty cycle of the engine, determining an expected pressure drop across the particulate filter based on the expected total ash accumulation rate, comparing the expected pressure drop with the actual pressure drop, and determining whether an oil consumption rate in the engine is abnormal based on the comparison.

In some embodiments, the controller further executes computer-readable instructions to determine the expected pressure drop based on a first calibration table. In some embodiments, the first calibration table comprises a soot and ash loaded calibration table comprising a plurality of pressure drops across a test particulate filter and a corresponding soot and ash accumulation rate in the test particulate filter at each of the plurality of pressure drops. In some embodiments, the first calibration table comprises an ash loaded calibration table comprising a plurality of pressure drops across a test particulate filter and a corresponding ash accumulation rate in the test particulate filter at each of the plurality of pressure drops.

In some embodiments, the controller further executes computer-readable instructions to determine the expected total ash accumulation rate based on the first calibration table and a second calibration table. In some embodiments, the first calibration table comprises a plurality of pressure drops across a test particulate filter and a corresponding first ash accumulation rate or a soot and ash accumulation rate in the test particulate filter at each of the plurality of pressure drops, and wherein the second calibration table comprises a plurality of duty cycles and a corresponding estimated oil consumption rate at each of the plurality of duty cycles. In some embodiments, the second calibration table further comprises an additional calibration table comprising a corresponding second ash accumulation rate corresponding to the estimated oil consumption rate at each of the plurality of duty cycles.

In some embodiments, the controller further executes computer-readable instructions for determining that the oil consumption rate in the engine is abnormal based on the actual pressure drop being greater than the expected pressure drop, and that the oil consumption rate in the engine is not abnormal based on the actual pressure drop being less than or equal to the expected pressure drop.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the term "about" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation.

Conversely, various features described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system comprising:
   a particulate filter configured to receive exhaust gas from an engine; and
   a controller that executes computer-readable instructions stored on a memory to:
      determine an actual pressure drop across the particulate filter based on pressure measurements across the particulate filter;
      determine an expected total ash accumulation rate in the particulate filter based on a first calibration table comprising a plurality of pressure drops across a test particulate filter and a corresponding first ash accumulation rate or a soot and ash accumulation rate in the test particulate filter at each of the plurality of pressure drops and a second calibration table comprising a plurality of duty cycles and a corresponding estimated oil consumption rate at each of the plurality of duty cycles;
      determine an expected pressure drop across the particulate filter based on the expected total ash accumulation rate;
      compare the expected pressure drop with the actual pressure drop;
      determine whether an oil consumption rate of the engine is abnormal based on the comparison; and
      responsive to determining the oil consumption rate of the engine is abnormal, raising an alert to indicate abnormal oil consumption rate.

2. The aftertreatment system of claim 1, wherein the controller executes the computer-readable instructions to determine the expected pressure drop based on the first calibration table.

3. The aftertreatment system of claim 1, wherein the second calibration table further comprises an additional calibration table comprising a corresponding second ash accumulation rate corresponding to the estimated oil consumption rate at each of the plurality of duty cycles.

4. The aftertreatment system of claim 1, wherein the controller executes the computer-readable instructions to determine that the oil consumption rate in the engine is abnormal based on the actual pressure drop being greater than the expected pressure drop, and that the oil consumption rate in the engine is not abnormal based on the actual pressure drop being less than or equal to the expected pressure drop.

5. A method comprising:
   determining, by a controller of an aftertreatment system, an actual pressure drop across a particulate filter configured to receive exhaust gas from an engine based on pressure measurements across the particulate filter;
   determining, by the controller, an expected total ash accumulation rate in the particulate filter based on a first calibration table comprising a plurality of pressure drops across a test particulate filter and a corresponding first ash accumulation rate or a soot and ash accumulation rate in the test particulate filter at each of the plurality of pressure drops and a second calibration table comprising a plurality of duty cycles and a corresponding estimated oil consumption rate at each of the plurality of duty cycles;
   determining, by the controller, an expected pressure drop across the particulate filter based on the total ash accumulation rate;

comparing, by the controller, the expected pressure drop with the actual pressure drop;

determining, by the controller, whether an oil consumption rate in the engine is abnormal based on the comparison; and responsive to determining the oil consumption rate of the engine is abnormal, raising, by the controller, an alert to indicate abnormal oil consumption rate.

6. The method of claim 5, further comprising determining, by the controller, the expected pressure drop based on the first calibration table.

7. The method of claim 5, wherein the second calibration table further comprises an additional calibration table comprising a corresponding second ash accumulation rate corresponding to the estimated oil consumption rate at each of the plurality of duty cycles.

8. The method of claim 5, further comprising determining, by the controller, that the oil consumption rate in the engine is abnormal based on the actual pressure drop being greater than the expected pressure drop, and that the oil consumption rate in the engine is not abnormal based on the actual pressure drop being less than or equal to the expected pressure drop.

9. A non-transitory computer-readable media comprising computer-readable instructions stored thereon that when executed by a controller of an aftertreatment system causes the controller to perform a process comprising:

determining an actual pressure drop across a particulate filter configured to receive exhaust gas from an engine based on pressure measurements across the particulate filter;

determining an expected total ash accumulation rate in the particulate filter based on a first calibration table comprising a plurality of pressure drops across a test particulate filter and a corresponding first ash accumulation rate or a soot and ash accumulation rate in the test particulate filter at each of the plurality of pressure drops and a second calibration table comprising a plurality of duty cycles and a corresponding estimated oil consumption rate at each of the plurality of duty cycles;

determining an expected pressure drop across the particulate filter based on the expected total ash accumulation rate;

comparing the expected pressure drop with the actual pressure drop;

determining whether an oil consumption rate in the engine is abnormal based on the comparison; and responsive to determining the oil consumption rate of the engine is abnormal, raising an alert to indicate abnormal oil consumption rate.

10. The non-transitory computer-readable media of claim 9, wherein the controller executes the computer-readable instructions to determine the expected pressure drop based on the first calibration table.

11. The non-transitory computer-readable media of claim 9, wherein the second calibration table further comprises an additional calibration table comprising a corresponding second ash accumulation rate corresponding to the estimated oil consumption rate at each of the plurality of duty cycles.

12. The non-transitory computer-readable media of claim 9, wherein the controller further executes computer-readable instructions for determining that the oil consumption rate in the engine is abnormal based on the actual pressure drop being greater than the expected pressure drop, and that the oil consumption rate in the engine is not abnormal based on the actual pressure drop being less than or equal to the expected pressure drop.

* * * * *